3,016,361
CONDENSATION ELASTOMERS FROM FLUORINE CONTAINING DICARBOXYLIC COMPOUNDS
George C. Schweiker, Niagara Falls, and Paul Robitschek, Wilson, N.Y., assignors to Hooker Chemical Corporation, Niagara Falls, N.Y., a corporation of New York
No Drawing. Filed Sept. 16, 1957, Ser. No. 683,978
31 Claims. (Cl. 260—40)

This invention relates to fluorine-containing elastomers, and more particularly refers to elastomers formed from condensation products of polyhydric alcohols with dicarboxylic compounds containing fluorine.

The advent of modern high-speed, high-altitude aircraft has created a need for elastomers which will withstand the extreme conditions encountered. The first requirement is that the elastomer should show good resistance to hydrocarbon fuels, lubricants, hydraulic fluids, and aqueous salt and acid solutions. A second requirement is that the elstomer be able to withstand high temperatures for prolonged periods of time. Another requirement is that the elastomer retain its good flexibility even when subjected to low temperatures such as are encountered at high altitudes, or in Arctic regions.

A number of elastomers have been developed in the past which have attempted to meet these conditions. Many of these elastomers have exhibited several of the required properties but none has exhibited them all. For example, solvent-resistant addition polymers have been made by copolymerization with highly polar monomers, but these materials have lacked good low temperature flexibility. Organic polysulfide elastomers have been made which have good resistance to fuels and retain good low temperature flexibility. However, they have poor heat resistance. Fluorinated alkyl acrylates and other addition type fluorinated polymers and copolymers, such as copolymers of vinylidene fluoride with chlorotrifluoroethylene or perfluoropropene have been developed, some of which show excellent solvent resistance to most non-fluorinated solvents, and some of which additionally are serviceable at high temperatures in air. However, low temperature flexibility of these materials is poor. Various diisocyanate modified hydrocarbon polyesters have been developed which exhibit high tensile strength, high tear resistance, high abrasion resistance, good elasticity, good solvent resistance and good oxidation stability. However, their high temperature stability is not good. Some attempts additionally have been made to produce an elastomer from polyesters produced by reacting perfluorinated cabonxylic acids with diols. However, none of the attempts have been successful in achieving a polyester which has sufficiently high molecular weight from which an elastomer could be made.

It is an object of the present invention to provide an elastomer which has high resistance to the solvent action of hydrocarbon fuels, lubricating oils, and hydraulic fluids, as well as adequate hydrolytic stability in aqueous salt and acid solutions. It is also an object to provide an elastomer which exhibits excellent resistance to high temperatures. It is additionally an object of this invention to provide an elastomer which is flexible at low temperatures. It is still further an object of this invention to provide an elastomer which has the good physical properties generally desired of a high-grade elastomer. It is a further object of this invention to provide a method for producing high molecular weight linear polyesters from fluorine-containing dicarboxylic compounds having at least one methylene spacer between the perfluoroalkyl and carboxylic groups which may be subsequently cured to form elastomers. It is still further an object to provide methods for cross-linking and for compounding the high molecular weight linear polyesters formed to produce elastomers having the properties above-described. Another object is the preparation of novel linear polyesters which are used in order to produce the elastomers having the properties above-described. Further objects of the present invention will become apparent from the following description and examples.

In the co-pending application Serial No. 646,968, filed March 19, 1957, elastomeric materials are disclosed which contain substantial amounts of fluorine and which are based on the reaction of hydrocarbon dicarboxylic compounds and fluorinated diols, and which are stable hydrolytically.

It has now been found that whereas it is possible to prepare sufficiently high molecular weight polyesters by reacting perfluorinated dicarboxylic compounds with polyhydric alcohols, such polymers are hydrolytically unstable, and are hence not suitable for practical usage. It has been also found despite this however, that the objects of the present invention as stated above can be achieved if a fluorine-containing dicarboxylic compound is used which is characterized by having at least one methylene spacer between a perfluoroalkyl and carboxylic group.

The dicarboxylic compounds containing fluorine must have at least one methylene group between each carboxylic function and fluorinated moiety because it has been found that polyesters containing fluorine on carbon atoms alpha to the carboxylic function are hydrolytically unstable, as shown in Examples 15–20, below. Various perfluoroalkyl dicarboxylic compounds with such methylene spacer falling within the scope of the dicarboxylic compounds claimed may be used, among them being compounds of the following structures:

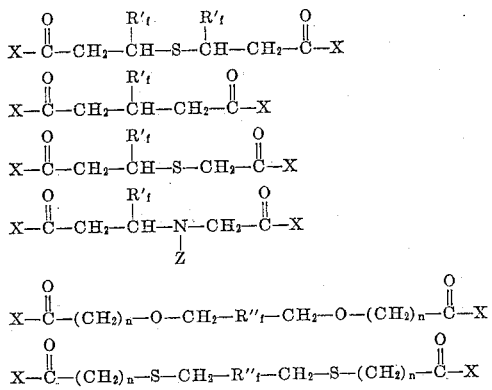

wherein $R'_f$ is a lower perfluoroalkyl group containing from one to seven carbon atoms, $R''_f$ is a lower perfluoroalkylene group containing from one to seven carbon atoms, X is selected from the group consisting of hydroxy, chloro-, lower alkoxy and anhydro-, Z is selected from the group consisting of alkyl and 1,1-dihydro perfluoroalkyl, and $n$ is an integer from one to three.

The acids, anhydrides, esters, and acid chlorides of the dicarboxylic compounds may be used for the preparation of the polyesters in the reaction with a polyhydric alcohol. When the polyhydric alcohol also contains fluorine, however, it has been found that the dicarboxylic acid chlorides are most useful in most cases because of the faster rate of reaction manifested. Among the dicarboxylic compounds within this definition are 3,5-bis(perfluoromethyl)-4-thiaheptanedioic; 3,5-bis(perfluoroethyl)-4-thiaheptanedioic; 3,5-bis(perfluoropropyl)-4-thiaheptanedioic; 3,5-bis(perfluorobutyl)-4-thiaheptanedioic; 3,5-bis(perfluoropentyl)-4-thiaheptanedioic; 3,5-bis(perfluorohexyl)-4-thiaheptanedioic; 3,5-bis(perfluoroheptyl)-4-thiaheptanedioic; 3-perfluoromethylglutaric; 3-perfluoroethylglutaric; 3-perfluoropropylglutaric;

3-perfluorobutylglutaric; 3-perfluoropentylglutaric; 3-perfluorohexylglutaric; 3-perfluoroheptylglutaric; 3-perfluoromethyl-4-thiaadipic; 3-perfluoroethyl-4-thiaadipic; 3-perfluoropropyl - 4 - thiaadipic; 3 - perfluorobutyl-4-thiaadipic; 3-perfluoropentyl-4-thiaadipic; 3-perfluorohexyl-4-thiaadipic; 3-perfluoroheyptyl-4-thiaadipic; 4-perfluoropropyl-3-methyl-3-azaadipic; 4-perfluoropropyl-3-ethyl-3-azaadipic; 4 - perfluoropropyl - 3 - (1,1-dihydroperfluorobutyl) - 3 - azaadipic; 4 - perfluoroheptyl-3-methyl-3-azaadipic; 3-perfluoropropyl,3,4,4-trifluoroadipic; 3-perfluoropropyl,3,4,4 - trifluorooctanedioic; 5,5,6,6,7,7-hexafluoro - 3,9 - dioxaundecanedioic; 5,5,6,6,7,7,8,8 - octafluoro-3,10-dioxadodecanedioic; 6,6,7,7,8,8-hexafluoro-4,10-dioxatridecanedioic; 6,6,7,7,8,8,9,9 - octafluoro - 4,11 - dioxatetradecanedioic; 5,5,6,6,7,7 - hexafluoro - 3,9 - dithiaundecanedioic;

5,5,6,6,7,7,8,8 - octafluoro - 3,10 - dithiadodecanedioic; 6,6,7,7,8,8-hexafluoro-4,10-dithiatridecanedioic; 6,6,7,7,8,8,9,9-octafluoro-4,11-dithiatetradecanedioic; acid; acid chloride; acid ester; etc.

Examples of syntheses of the compounds used in examples below except the diacid chloride shown in Examples 12 and 13 are described by E. T. McBee et al., in copending application filed of even date herewith, S.N. 683,985, now U.S. Patent No. 2,908,710, or in J. Am. Chem. Soc., 79, 2323 (1957). The diacid chloride, 5,5,6,6,7,7 - hexafluoro-3,9-dioxaundecanedioyl chloride, used in Examples 12 and 13, has been synthesized in the following manner by E. T. McBee, C. W. Roberts, and Gordon Wilson, Jr.

A solution of sodium ethoxide prepared from 4.6 grams (0.2 g. atom) of sodium and 110 ml. of absolute ethanol was added to a solution of 21.2 grams (0.1 mole) of 2,2,3,3,4,4-hexafluoropentanediol in 200 ml. of dioxane. After removal of the ethanol by distillation through a 30 cm. Vigreaux column, a solution of 33.4 grams (0.2 mole) of ethyl bromo-acetate in 100 ml. of dioxane was added and the mixture was refluxed for 5 hours. The solvent was removed by distillation, the residue was diluted with 500 ml. of benzene, and the sodium bromide and unreacted diol were removed by washing with water. After drying with Drierite, the benzene solution was fractionated to give 29.6 grams (77%) of diethyl 5,5,6,6,7,7-hexafluoro-3,9-dioxaundecanedioate, B.P. 134–135° C. (0.1 mm.), $n_D^{20}$ 1.4010, $d_4^{20}$ 1.345.

Analysis.—Calcd. for $C_{13}H_{18}F_6O_6$: C, 40.63; H, 4.72; MR, 69.58. Found: C, 40.93; H, 4.50; $MR_D$, 69.40.

A solution of 6.0 grams (0.016 mole) of diethyl 5,5,6,6,7,7-hexafluoro-3,9-dioxaundecanedioate in 50 ml. of 90% formic acid was fractionally distilled until no further ethyl formate could be obtained. The excess formic acid was removed by distillation at 100 mm. and the solid residue was recrystallized from toluene to give 3.9 grams (76%) of 5,5,6,6,7,7-hexafluoro-3,9-dioxaundecanedioic acid, M.P. 82–83° C.

Analysis.—Calcd. for $C_9H_{10}F_6O_6$: C, 32.94; H, 3.07. Found: C, 32.89; H, 3.09.

Thionyl chloride (17.9 grams, 0.15 mole) was added to 16.4 grams (0.05 mole) of 5,5,6,6,7,7-hexafluoro-3,9-dioxaundecanedioic acid and the mixture was refluxed for 3.5 hours. The excess thionyl chloride was removed by distillation at 100 mm. pressure and the residue was distilled in vacuo to give 16.9 grams (93%) of slightly yellow liquid product, B.P. 110° C. (0.1 mm.), M.P. 49–52° C. Recrystallization from hexane produced pure 5,5,6,6,7,7-hexafluoro-3,9-dioxaundecanedioyl chloride, M.P. 52.5–53° C.

Analysis.—Calcd. for $C_9H_8F_6O_4Cl_2$: C, 29.61; H, 2.21; Cl, 19.42. Found: C, 29.61; H, 2.43; Cl, 19.20.

The polyhydric alcohol may also vary considerably; however, of these we prefer to employ the dihydric alcohols, or diols. Among the polyhydric alcohols which may be employed are the common hydrocarbon and oxahydrocarbon diols, and fluorine-containing diols, having structures such as $$HOC_nH_{2n}OH$$
$$HOC_nH_{2n}OC_nH_{2n}OH$$
$$HOCH_2C_nF_{2n}CH_2OH$$

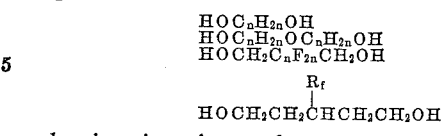

wherein $n$ is an integer from 2 to about 10, and wherein $R_f$ is a perfluoroalkyl group of from 1 to about 7 carbon atoms. Among the compounds within this definition are ethylene glycol; propylene glycol; 1,3-propanediol; butanediol; pentanediol; hexanediol; heptanediol; octanediol; nonanediol; decanediol; diethylene glycol; 2,2,3,3 - tetrafluorobutanediol; 2,2,3,3,4,4 - hexafluoropentanediol; 2,2,3,3,4,4,5,5-octafluorohexanediol; 3-perfluoromethyl 1,5-pentanediol; 3-perfluoroethyl 1,5-pentanediol; 3-perfluoropropyl 1,5-pentanediol; 3-perfluoroheptyl 1,5-pentanediol; etc. Examples of syntheses of the fluorine-containing diols which contain a perfluoroalkyl side chain are given by E. T. McBee et al., loc. cit.

Total fluorine content of polyester elastomer gums has been related to solvent resistance, as shown in Table II. It is clear that as total fluorine content of the polyesters increases, solubility in common hydro-carbon solvents decreases. For this reason, it is very much preferred to use a fluorine-containing dicarboxylic compound with a fluorine-containing diol, in order to make the most solvent resistant as well as thermally stable elastomers.

The elastomers thus produced have been found extremely useful for application in aircraft and other vehicles where elastomers having good hydrocarbon fuel, lubricant, hydraulic fluid and aqueous acid and salt solution resistance, together with high temperature resistance and low temperature flexibility are needed for such applications as gas tank sealants, O-rings, fuel conduits, etc.

The linear polyester is first prepared by condensing the fluorine-containing dicarboxylic compound with the polyhydric alcohol. The dicarboxylic compound can be used as either the diacid, anhydride, diester, or the diacid chloride. However, it has been found in practice that the use of the diacid chloride greatly facilitates the esterification reaction, especially when a fluorinated polyhydric alcohol is used. Esterification is carried out until the linear polyester has a number average molecular weight as determined from viscosity of about 3,000, and preferably greater than 5,000. The process is generally carried out in an inert atmosphere such as nitrogen, especially when at higher temperatures, and the temperatures used may be from below room temperature at the start of the reaction to 250 degrees centigrade or over at the end of the reaction, depending upon the nature of the reactants and the products. After the desired molecular weight has been reached, the linear polyester is reacted with a cross-linking agent to produce the cured elastomer.

The cross-linking may be accomplished by one of several methods. First the linear polyester may be cross-linked by reacting it with a free radical polymerization catalyst such as peroxides, typified by dicumyl peroxide, benzoyl peroxide, tert-butyl peroxide, chlorobenzoic peroxides, etc. It is believed that the free radical formed attacks the active hydrogen in the chain and sets up a bond between one chain and another. The linear polyesters may also be extended and cross-linked by reaction with polyisocyanates, for instance with a diisocyanate such as methylene bis(4-phenylisocyanate). Alternatively, a small amount of an unsaturated acid such as maleic, fumaric, itaconic, hexenedioic acid and bis($\alpha,\omega$-methylene) hydrocarbon dicarboxylic acid can be included in the linear polyester during the esterification, and the linear polyester subsequently cross-linked either with or without a copolymerizable monomer containing a carbon-to-carbon double bond such as styrene, divinyl benzene, vinyl pyridine, acrylates, vinyl acetate, etc. in the presence of a free-radical polymerization catalyst such as dicumyl peroxide, benzoyl peroxide, tert-butyl peroxide, chlorobenzoic peroxides. In another method the terminal hydroxyl groups of the linear chains may be extended and cross-linked by reaction with polyepoxides in the presence or absence of catalysts such as amines, diamines or dicarboxylic acids, or by polyketenes, polyacid chlorides, anhydrides and polyanhydrides.

The preferred epoxy resins are the phenyl glycidyl ether reaction products of bisphenol and epichlorhydrin.

In order to impart certain desired properties, various fillers, reinforcing agents, antioxidants, softeners and extenders traditionally used in the rubber art may be incorporated in the elastomer of the present invention. Among these are the various carbon blacks, mineral fillers, and special additives.

The following examples serve to illustrate various methods of practising the present invention.

EXAMPLE 1

A reaction tube is fitted with a gas inlet tube extending to the bottom of the reactor, and an outlet is provided which can be attached to either a vacuum source or left open to the atmosphere. The apparatus is placed in an oil bath whose temperature is controlled by a Fenwall Thermoswitch. Into the reaction tube is placed 4.014 parts of 3-perfluoropropylglutaryl chloride and 2.526 parts of 2,2,3,3,4,4-hexafluoropentanediol (equimolar quantities) and the mixture is heated slightly. Nitrogen which is purified by alkaline pyrogallol followed by concentrated sulfuric acid is passed through the reaction mixture during the heating period. A reaction ensues which is characterized by the strong evolution of hydrogen chloride. After the initial reaction has subsided to some extent, the temperature of the reaction mixture is gradually increased over a period of about 22 hours until a temperature of about 200° C. is attained. Purified nitrogen is passed through the reaction mixture at a slow rate during this period. After the temperature is maintained at about 200° C. for a short time, a vacuum is applied intermittently for 15 to 30 minutes at the end of the reaction. The resulting linear polyester containing fluorine had a viscosity of about 33 poises at 110° C., and a number average molecular weight calculated from the viscosity measurement of about 7,900.

The following example illustrates another novel method of condensing a polyhydric alcohol with a dicarboxylic compound containing at least one perfluoroalkyl side chain, and at least one methylene group between each carboxylic function and perfluoroalkyl group.

EXAMPLE 2

Using the apparatus and procedure of Example 1, 10.418 parts of 3-perfluoropropylglutaryl chloride, 6.556 parts of 2,2,3,3,4,4-hexafluoropentanediol, and approximately 5 parts of dichlorohexafluoroxylene is charged into the reaction tube. The mixture is heated slightly to initiate the reaction which is characterized by the strong evolution of hydrogen chloride. The temperature of the mixture is gradually increased over a period of about 15 hours until a temperature of about 200° C. is attained, while purified nitrogen is continually passed through the reaction mixture. After maintaining the reaction mixture at this temperature for a short time, a vacuum is applied to remove the inert solvent by distillation from the product. The resulting linear polyester containing fluorine had a viscosity of about 37 poises at 110° C., and a number average molecular weight calculated from the viscosity measurement of about 9,000.

Other compounds may be used in place of dichlorohexafluoroxylene, among which are the various isomers of liquid chlorobenzenes and chlorobenzotrifluorides, etc. The general requirements of these compounds are that they must be inert to the reactants, stable at the reaction temperatures employed, and removable in a simple manner and at a suitable temperature, such as by vacuum distillation. This temperature must be, of course, lower than that which would cause thermal degradation of the polyester. In addition, the reactants and the polyester should be soluble in the compound at the reaction temperatures employed.

To produce polyesters having a relatively high number average molecular weight, the optimum ratio of dicarboxylic chlorides to dihydric alcohol is in the vicinity of unity. However, satisfactory lower to moderate molecular weight polyesters can be made by using ratios of dicarboxylic acid chloride to dihydric alcohol varying from unity to about 0.900 or to about 1.030 in the other direction.

The viscosity and molecular weight of the polyester can thus be controlled by controlling the mole ratio of diol/diacid chloride. When an excess of diol is used, the chain endings are primarily hydroxyl groups, which is beneficial for certain extension and cross-linking reactions.

Another method of controlling molecular weights which may be used is to add a chain stopper in minor proportions in order to terminate the growth of the polyester chain, or to reduce the number of free carboxyl or hydroxyl groups, or to introduce a hydrocarbon or fluorocarbon terminal residue. Among the compounds which may be used as chain stoppers are a wide variety of monohydric alcohols, such as butyl, hexyl octyl, dodecyl, benzyl, etc., or partially fluorinated alcohols such as 1,1-dihydroperfluoroalkyl alcohols, or monobasic acids or acid chlorides such as acetic, propionic, butyric, ethylhexoic, benzoic, etc.

When using linear polyesters of lower or moderate molecular weights, it is sometimes desirable to extend their chain length prior to the cross-linking process. This may be done by reacting the linear polyester with diisocyanates or with a mixture of diisocyanate and a small amount of an amine such as quinoline at a temperature of from about 100° to 160° C. Diamines may also be used such as phenylene diamine. The diisocyanate reacts with the terminal hydroxyl groups and effects a chain extension. Chain extension may also be accomplished by reaction with polyepoxides, diketenes, diacid chlorides, anhydrides and dianhydrides, etc. Of the diisocyanates, those containing aromatic rings are most suitable. Among the most common are methylene bis(4-phenylisocyanate), 2,4-tolylene diisocyanate, 2,6-tolylene diisocyanate, etc. Methylene bis (4-phenylisocyanate) is preferred.

EXAMPLE 3

One mol of a linear polyester, prepared as described in Example 1, 1.10 moles of methylene bis(4-phenylisocyanate) and 0.10 mol of hexamethylene diamine is mixed together at 120° to 130° C. for about 20 minutes. The reaction mixture is then transferred to a greased tray and heated at 130° to 160° C. overnight in an oven. As a result of this chain extension process, the molecular weight of the linear polyester is substantially increased, and the resultant extremely viscous gum is suitable for cross-linking reaction by either further polyisocyanate reaction, or reaction with peroxide to produce a vulcanized elastomer.

EXAMPLE 4

Using the method of Example 1, 4.003 parts of 3-perfluoropropylglutaryl chloride and 3.113 parts of 2,2,3,3,4,4,5,5-octafluorohexanediol (equimolar quantities) is charged into the reaction tube and the reactants are gradually heated to about 200° C., with purified nitrogen passing through the reaction mixture. After the reaction is complete as noted by cessation of hydrogen chloride evolution, and no further increase in viscosity of the reaction product, vacuum is applied intermittently for 15 to 30 minutes. The resulting linear polyester containing fluorine had a viscosity of about 45 poises at 110° C., and a number average molecular weight calculated from the viscosity measurement of about 8,800.

EXAMPLE 5

Using the method of Example 2, 12.026 parts of 3-perfluoropropylglutaryl chloride and 9.353 parts of 2,2,3,3,4,4,5,5-octafluorohexanediol (equimolar quantities) and approximately 5 parts of dichlorohexafluoroxylene is charged into the reaction tube and the reactants are gradually heated to about 200° C., with purified nitrogen passing through the reaction mixture. After the reaction is complete as noted by cessation of hydrogen chloride evolution, and no further increase in viscosity of the reaction mixture, vacuum is applied to remove the inert solvent by distillation from the product. The resulting linear polyester containing fluorine had a viscosity of about 51 poises at 110° C., and a number average molecular weight calculated from the viscosity measurement of about 9,900.

The linear polyester as formed above may be cross-linked by any of the methods described below to produce vulcanized fluorine-containing elastomers.

The examples in Table I, below, show the preparation of various linear polyesters of the present invention by the methods fully described above using various dicarboxylic compounds containing at least one perfluoroalkyl group, and at least one methylene group between the carboxylic function and the fluorinated moiety, and various dihydric alcohols. A molar ratio of starting materials of approximately unity is used in every case. Viscosities are measured at 110° C. and are obtained by applying the methods described by P. Flory, J. Am. Chem. Soc., 62, 1057 (1940), for hydrocarbon polyesters. Number average molecular weights are calculated from the viscosity measurements using equations described by Flory, loc. cit.

All of the polyesters listed in Table I contain very high fluorine contents, making the polymers insoluble in common fuels and oils. They are all insoluble in benzene, toluene, chloroform, water, diester oil Plexol 201, isooctane, etc. As can be seen from Table II, however, when total fluorine content of fluorine-containing polyesters drops below about 52%, the polyesters become partly soluble in chloroform; and when total fluorine content is lowered to 35%, the polyesters become soluble in benzene. From the standpoint of solvent resistance, it is clear that the higher the total fluorine content of the polyesters, the more resistant are the polymers to common solvents.

*Table I*

LINEAR POLYESTERS CONTAINING FLUORINE

| Example No. | Starting Materials | Viscosity (poise) | Mol. Wt. |
|---|---|---|---|
| Example 6 | 3-Perfluoropropylglutaryl Chloride 2, 2, 3, 3, 4, 4-Hexafluoropentanediol. | 25 (110° C.) | 7,200 |
| Example 7 | 3-Perfluoropropylglutaryl Chloride 2, 2, 3, 3, 4, 4, 5, 5-Octafluorohexanediol. | 34.5 (110° C.) | 9,940 |
| Example 8 | 3-Perfluoroheptylglutaryl Chloride 2, 2, 3, 3, 4, 4-Hexafluoropentanediol. | 21.9 (110° C.) | 9,920 |
| Example 9 | 3-Perfluoroheptylglutaryl Chloride 2, 2, 3, 3, 4, 4, 5, 5-Octafluorohexanediol. | 27.1 (110° C.) | 10,400 |
| Example 10 | 3,5-Bis (perfluoropropyl)-4-thiapimelyl Chloride 2, 2, 3, 3, 4, 4-Hexafluoropentanediol. | 2.94 (169° C.) | 7,480 |
| Example 11 | 3,5-Bis (perfluoropropyl)-4-thiapimelyl Chloride 2, 2, 3, 3, 4, 4, 5, 5-Octafluorohexanediol. | 2.38 (169° C.) | 7,400 |
| Example 12 | 5, 5, 6, 6, 7, 7-Hexafluoro-3, 9-dioxaundecanedioyl Chloride 2, 2, 3, 3, 4, 4-Hexafluoropentanediol. | 12.5 (110° C.) | 5,360 |
| Example 13 | 5, 5, 6, 6, 7, 7-Hexafluoro-3, 9-dioxaundecanedioyl Chloride 2, 2, 3, 3, 4, 4, 5, 5-Octafluorohexanediol. | 15.4 (110° C.) | 6,850 |

*Table II*

DECREASING SOLUBILITY OF FLOURINE CONTAINING POLYESTERS WITH INCREASING FLOURINE CONTENT

| Polyester | No. Ave. Mol. Wt. ($M_n$) | Degree of Polym. ($X_n$) | Wt. Ave. Chain Length ($Z_w$) | Percent F (Ca.) | Solubility[1] (0.1 g./3 cc.) | | | | |
|---|---|---|---|---|---|---|---|---|---|
| | | | | | Benzene | Toluene | Chloroform | Isooctane | Plexol 201 |
| A | 11,000 | 58.1 | 980 | 30.2 | + | + | + | − | − |
| B | 25,000 | 155 | 2010 | 35.4 | + | − | + | − | − |
| C | 24,000 | 129 | 1800 | 40.6 | − | − | + | − | − |
| D | 6,600 | 25.1 | 427 | 41.4 | − | − | + | − | − |
| [OCH$_2$(CF$_2$)$_3$CH$_2$O$_2$CCH$_2$ĊHCH$_2$CO]$_y$ (C$_3$F$_7$ branch) | 7,860 | 33.0 | 392 | 51.9 | − | − | ± | − | − |
| [OCH$_2$(CF$_2$)$_3$CH$_2$O$_2$C(CF$_2$)$_4$CO]$_y$ | 13,500 | 58.0 | 750 | 57.1 | − | − | − | − | − |
| [OCH$_2$(CF$_2$)$_4$CH$_2$O$_2$C(CF$_2$)$_4$CO]$_y$ | 15,000 | 58.2 | 810 | 58.9 | − | − | − | − | − |
| ]OCH$_2$(CF$_2$)$_4$CH$_2$O$_2$CCH$_2$ĊHCH$_2$CO]$_y$ (C$_7$F$_{15}$ branch) | 10,400 | 28.8 | 369 | 60.2 | − | − | − | − | − |

[1] Room temperature solubility: + soluble; − insoluble.

All of the fluorine-containing polyesters of this invention are also resistant to hydrolysis. This is not the case when perfluorodicarboxylic compounds are reacted into polyesters.

The following examples illustrate the vast differences in hydrolytic stability between fluorine-containing polyesters prepared with the dicarboxylic compounds of the present invention and those prepared with perfluorodicarboxylic compounds.

EXAMPLE 14

The polyesters of Examples 1 through 13 are placed in test tubes and distilled water is added. The two phase mixture is shaken daily and the pH of the aqueous layer is determined at intervals. After seven days of standing in water there is still no change in pH, indicating that no acid is formed and that the polyesters are hydrolytically stable under these conditions.

EXAMPLES 15–16

Polyesters prepared from equimolar quantities of perfluoroadipyl chloride and 2,2,3,3,4,4-hexafluoropentanediol, and 2,2,3,3,4,4,5,5-octafluorohexanediol, respectively, using the apparatus and general procedures described in Examples 1 and 2, when submitted to the same treatment described in Example 14 are found to be hydrolytically unstable. After several days of standing in distilled water, the pH of the aqueous layers decrease to approximately 1, indicating that a strong acid arising from hydrolysis of the polyesters is dissolved in the aqueous layers.

EXAMPLE 17

A polyester prepared from equimolar quantities of perfluoroadipic acid and 2,2,3,3,4,4-hexafluoropentanediol, with 0.01% zinc chloride catalyst, essentially made according to the procedure described in Example 1, except that length of heating is substantially increased when the dicarboxylic acid rather than dicarboxylic acid chloride is used, also hydrolyzed readily when submitted to the treatment described in Example 14. Comparison of this polyester with that prepared as described in Example 15 shows the essential equivalency of the polyesters to hydrolytic attack regardless of the method used for their preparation, when they contain fluorine on a carbon atom alpha to the carboxylic group.

EXAMPLES 18–20

Polyesters from the reaction of hexafluoroglutaric acid with pentanediol, 2,2,3,3,4,4-hexafluoropentanediol, and 2,2,3,3,4,4,5,5-octafluorohexanediol, respectively, essentially made according to the procedure described in Example 1, except that 0.05% zinc chloride catalyst is added to the reaction mixture and length of heating is substantially increased when the dicarboxylic acid rather than dicarboxylic acid chloride is used, also hydrolyze readily when submitted to the treatment described in Example 14. Hydrolytic instability of these polyesters is also shown by the fact that fading end points are obtained during routine titrations for neutralization equivalent determinations.

In order to produce a vulcanized elastomer, the linear polyesters produced in Examples 1 through 13 above must be cross-linked with a suitable cross-linking agent. Among those that are most useful are the peroxide free-radical catalysts such as dicumyl peroxide (either as such or as Di-Cup 40C, which is dicumyl peroxide contained on a calcium carbonate base, manufactured by Hercules Powder Company), benzoyl peroxide, tert-butyl peroxide, chlorobenzoic peroxides, etc. Where the polyester has been chain extended by a diisocyanate as described in Example 3, either peroxides or polyisocyanates may be used. Suitable diisocyanates are methylene bis(4-phenylisocyanate), 2,4-tolylene diisocyanate, 2,6-tolylene diisocyanate.

In order to promote the cross-linking step, a dicarboxylic compound containing aliphatic carbon-to-carbon unsaturation may be incorporated during the esterification of the linear polyester in relatively small amounts up to 30 mole percent based on the acids used. Among such compounds are fumaryl acid or chloride, itaconic acid, anhydride, or acid chloride, bis-(α-ω-methylene)hydrocarbon dicarboxylic acids or acid chlorides, maleic acid, and maleic anhydride. The linear polyester containing unsaturation may then be cross-linked by peroxide catalysts such as dicumyl peroxide, etc. Additionally, a copolymerizable monomer containing aliphatic carbon-to-carbon unsaturation such as styrene, vinyl pyridine, divinyl benzene, acrylates, vinyl acetate, etc., may be added to this unsaturated linear polyester in amounts ranging from 1 to 100 percent by weight, based on the polyester, in order to form bridges between the linear chains.

The following examples demonstrate the use of various cross-linking agents useful with the fluorine-containing linear polyesters.

EXAMPLE 21

A polyester is prepared according to the method described in Example 1, except that a mixture of dicarboxylic acid chlorides is reacted with the diol, one of the acid chlorides containing aliphatic carbon-to-carbon unsaturation. Equivalent amounts of 2,2,3,3,4,4-hexafluoropentanediol and a mixture of perfluoroadipyl and fumaryl chlorides, containing 4.1 mol percent fumaryl chloride, is heated for about 20 hours, and the resultant polyester had a viscosity of 48 poises at 110° C., corresponding to a number average molecular weight of about 8,700.

The partly unsaturated polyester is mixed with about 2% by weight of benzoyl peroxide and heated for about 50 minutes at about 130° C., transforming the linear fluorine-containing polyester to an elastic, vulcanized material.

EXAMPLE 22

Another portion of the linear fluorine-containing polyester containing a small amount of carbon-to-carbon unsaturation, described in Example 21, is mixed with about 20% by weight of 4-vinylpyridine and about 2% benzoyl peroxide and heated to about 110° C. for several hours. The linear polyester is transformed by this treatment to an elastic, vulcanized material.

EXAMPLE 23

The linear fluorine-containing polyester, prepared as described in Example 1, and chain extended with diisocyanate as described in Example 3, is mixed with an additional 0.5 mol of methylene bis(4-phenylisocyanate) and 1% by weight of quinoline. The mixture is transferred to a mold and heated at about 150° C. for about 90 minutes. The linear, diisocyanate extended, fluorine-containing polyester is transformed by this treatment to an elastic, vulcanized material.

In the cross-linking reaction with diisocyanates, increasingly higher molecular weight linear polyesters above about 10,000 before chain extending give increasingly weaker vulcanized elastomers.

EXAMPLE 24

The linear fluorine-containing polyester, prepared as described in Example 1, and chain extended with diisocyanate as described in Example 3, is mixed by milling on a conventional two roll rubber mill with about 5% by weight of Di-Cup 40C. (Di-Cup 40C is a mixture containing 40% of dicumyl peroxide on calcium carbonate, and is sold by the Hercules Company, Wilmington, Delaware.) The mixture is transferred to a mold and heated at about 165° C. for about 50 minutes. The linear, diisocyanate extended, fluorine-containing polyester is transformed by this treatment to an elastic vulcanized material.

After curing, dumbbell specimens were cut and tested on a Scott tester, model L-6, for tensile strength, modulus and elongation. The properties of the gum vulcanizate of Example 24 are as follows.

| | | |
|---|---|---|
| Tensile strength | p.s.i. | 585 |
| Elongation | percent | 420 |
| 300 percent modulus | p.s.i. | 270 |
| Set at break | percent | 1–2 |
| Hardness (Shore A) | | 45–50 |

To show the outstanding resistance of the gum vulcanizates of the present invention to the effects of hot air and hot fluid, specimens of the cross-linked elastomer prepared as in Example 24 are placed in an air oven at 350° F. for 250 hours, and in the diester lubricating oil Plexol 201 at 350° F. for 72 hours. After the air aging test at 350° F., the elastomer still retained an elongation of 250% and Shore A hardness of 38–43, showing that no hardening or resinification had occurred. After the oil aging test at 350° F., the elastomer still retained an elongation of 320% and Shore A hardness of 42–47, again showing that no hardening or resinification had occurred.

EXAMPLE 25

The linear fluorine-containing polyester, prepared as described in Example 2, is mixed with about 25% by weight of Di-Cup 40C and transferred to a mold. The mold is heated to about 150° C. for about 50 minutes under normal platen pressures. The linear polyester is transformed by this treatment to a strong elastic, tightly cured rubber.

EXAMPLES 26–33

The linear fluorine-containing polyesters of Examples 6–13 are treated with Di-Cup 40C as described in Example 25, and cured by heating at 150° C. for 50 minutes, transforming the linear polyesters into tough, elastic, vulcanized materials.

The particular curing temperatures and times used are dependent on a variety of factors including the type and viscosity of the polyester gum, the type and amount of curing agent, the type and amount of other compounding agents, etc. The curing temperature and time may thus be varied widely without departure from the scope of this invention. In addition to curing in the mold under pressure, curing or post-curing after the initial mold cure may be employed at elevated temperatures in an oven for various lengths of time.

In order to achieve the optimum tensile strength, tear resistance, and other desirable physical properties, a reinforcing filler commonly used in the rubber art is mixed into the linear polyester prior to cross-linking. An effective filler is carbon black, either used alone or in combination with other fillers such as calcium carbonates, iron oxides, silicas, etc.

Various common anti-oxidants may also be incorporated into the present elastomers, among which are Neozone D (phenyl-beta-naphthalamine marketed by Du Pont Co.), phenothiazine, Permalux (di-ortho-tolylguanidine salt of dicatechol borate marketed by Du Pont Co.), Age-Rite resin D (polymerized trimethyl dihydroquinoline marketed by R. T. Vanderbilt Co.) and Age-Rite white (symmetrical di-beta-naphthyl-para-phenylene diamine marketed by R. T. Vanderbilt Co.).

The following examples illustrate the preparation of reinforced elastomers.

EXAMPLE 34

The linear fluorine-containing polyester, prepared as described in Example 5, is mixed first with about 20 parts by weight of Furnex, an SRF carbon black, and then with about 25 parts by weight of Di-Cup 40C. The mixture is transferred to a mold and heated to about 150° C. for about 50 minutes. The linear polyester is transformed by this treatment to a very strong, elastic, reinforced rubber vulcanizate.

EXAMPLES 35–38

The linear fluorine-containing polyesters of Examples 6–9 are mixed in the manner described in Example 34 with about 20 parts of Furnex and about 25 parts of Di-Cup 40C, and cured in a mold at 150° C. for 50 minutes, transforming the linear polyesters to strong, elastic, reinforced rubber vulcanizates.

EXAMPLES 39–42

The linear fluorine-containing polyesters of Examples 6–9 are mixed first with about 50 parts of Furnex and about 20 parts of Purecal U, a fine particle size calcium carbonate marketed by Wyandotte Co., and then with about 35 parts of Di-Cup 40C. The mixtures are then transferred to a mold and heated at 150° C. for 50 minutes, transforming the linear polyesters into very strong, elastic, reinforced rubber vulcanizates.

EXAMPLE 43

Samples of the reinforced vulcanizates prepared as described in Examples 39–42 are immersed in various fluids, such as, iso-octane, 70/30-iso-octane/toluene, diester oil Plexol 201, MIL-O-5606 hydraulic fluid, JP-4 jet fuel, 10% hydrochloric acid solution and 10% sodium chloride solution, for 50–168 hours and examined. No significant swelling or other change in physical properties is observed indicating the outstanding resistance of the rubbers to the various fluids.

EXAMPLE 44

Samples of the reinforced vulcanizates prepared as described in Examples 39–42 are immersed in methanol-Dry Ice mixtures and tested for flexibility at low temperatures. At temperatures as low as −35° C. the vulcanizates are still flexible and not brittle, indicating the good low temperature properties of the rubbers.

EXAMPLE 45

A specimen of a reinforced vulcanizate prepared as described in Examples 39–42 is submitted to aging tests in air at 350° F. for 50 hours. At the end of the high temperature aging test, the vulcanizate is found to be still very strong and elastic. Weight loss of the specimen during the test was 6.4%, and there were no significant changes in mechanical properties.

Many variations of the present invention may be practiced by those skilled in the art without departing from the spirit or scope thereof except as limited by the appended claims.

We claim:

1. A linear polyester comprised of the reaction product of (1) a dicarboxylic compound having a formula selected from the group consisting of:

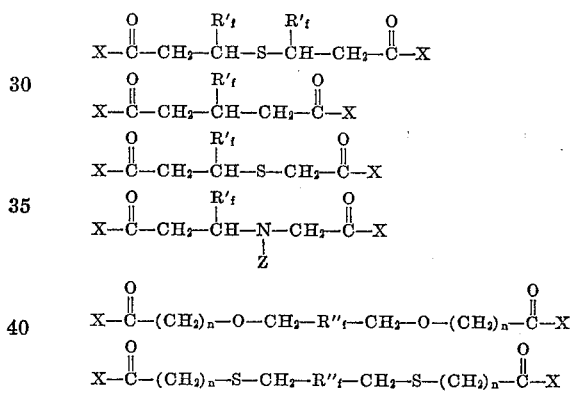

wherein $R'_f$ is a lower perfluoroalkyl group containing from one to seven carbon atoms, $R''_f$ is a lower perfluoroalkylene group containing from one to seven carbon atoms, X is selected from the group consisting of hydroxy, chloro-, lower alkoxy and anhydro-, Z is selected from the group consisting of alkyl and 1,1-dihydro perfluoroalkyl, and $n$ is an integer from one to three, and (2) a polyhydric alcohol.

2. A polyester according to claim 1 wherein said polyhydric alcohol is dihydric.

3. A linear polyester comprised of the reaction product of (1) a dicarboxylic compound having a formula selected from the group consisting of:

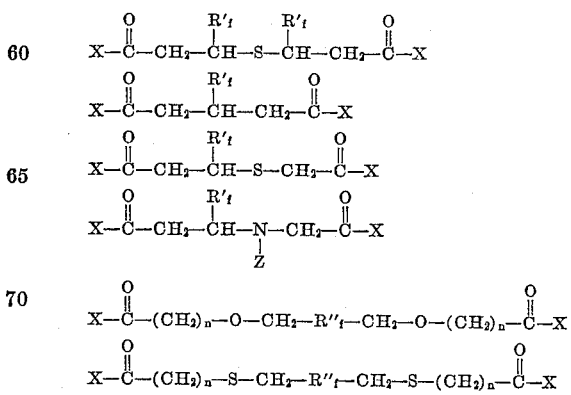

wherein $R'_f$ is a lower perfluoroalkyl group containing from one to seven carbon atoms, R″f is a lower perfluoroalkylene group containing from one to seven carbon atoms, X is selected from the group consisting of hydroxy, chloro-, lower alkoxy and anhydro-, Z is selected from the group consisting of alkyl and 1,1-dihydro perfluoroalkyl, and $n$ is an integer from one to three; and (2) a polyhydric alcohol having a formula selected from the group consisting of $$HOC_nH_{2n}OH$$
$$HOC_nH_{2n}OC_nH_{2n}OH$$
$$HOCH_2C_nF_{2n}CH_2OH$$

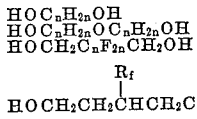

wherein $n$ is an integer from two to ten and wherein $R_f$ is a perfluoro alkyl group of from one to seven carbon atoms.

4. A linear polyester according to claim 3 wherein the dicarboxylic compound is 3-perfluoropropylglutaryl chloride and the polyhydric alcohol is 2,2,3,3,4,4-hexafluoropentanediol.

5. A linear polyester according to claim 3 wherein the dicarboxylic compound is 3-perfluoropropylglutaryl chloride and the polyhydric alcohol is 2,2,3,3,4,4,5,5-octafluorohexanediol.

6. A linear polyester according to claim 3 wherein the dicarboxylic compound is 3-perfluoroheptylglutaryl chloride and the polyhydric alcohol is 2,2,3,3,4,4,5,5-octafluorohexanediol.

7. A linear polyester according to claim 3 wherein the dicarboxylic compound is 3,5-bis(perfluoropropyl)-4-thiapimelyl chloride and the polyhydric alcohol is 2,2,3,3,4,4-hexafluoropentanediol.

8. A linear polyester according to claim 3 wherein the dicarboxylic compound is 3,5-bis(perfluoropropyl)-4-thiapimelyl chloride and the polyhydric alcohol is 2,2,3,3,4,4,5,5-octafluorohexanediol.

9. A linear polyester according to claim 3 wherein the dicarboxylic compound is 5,5,6,6,7,7-hexafluoro-3,9-dioxaundecanedioyl chloride and the polyhydric alcohol is 2,2,3,3,4,4-hexafluoropentanediol.

10. A linear polyester according to claim 3 wherein the dicarboxylic compound is 5,5,6,6,7,7-hexafluoro-3,9-dioxaundecanedioyl chloride and the polyhydric alcohol is 2,2,3,3,4,4,5,5-octafluorohexanediol.

11. A linear polyester according to claim 3 wherein there is additionally contained within said polyester a polycarboxylic compound containing aliphatic carbon-to-carbon unsaturation in an amount up to 30 mole percent based on the acid part of said polyester.

12. A linear polyester according to claim 3 wherein there is additionally contained a chain extending agent selected from the group consisting of polyisocyanates, polyepoxides, diamines, diketenes, diacid chlorides, anhydrides, dianhydrides, and mixtures of diisocyanates and amines.

13. A process for the preparation of a linear polyester which comprises reacting at an elevated temperature a mixture comprising (1) a dicarboxylic compound having a formula selected from the group consisting of:

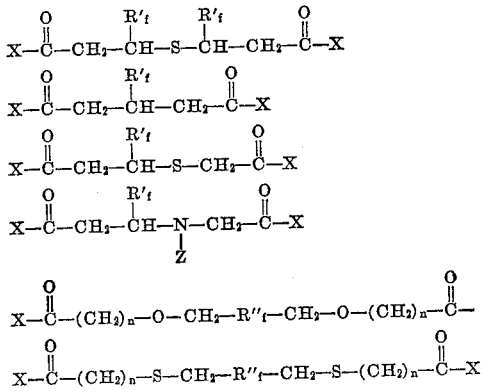

wherein R′f is a lower perfluoroalkyl group containing from one to seven carbon atoms, R″f is a lower perfluoroalkylene group containing from one to seven carbon atoms, X is selected from the group consisting of hydroxy, chloro-, lower alkoxy and anhydro-, Z is selected from the group consisting of alkyl and 1,1-dihydro perfluoroalkyl and $n$ is an integer from one to three; and (2) a polyhydric alcohol having a formula selected from the group consisting of $$HOC_nH_{2n}OH$$
$$HOC_nH_{2n}OC_nH_{2n}OH$$
$$HOCH_2C_nF_{2n}CH_2OH$$

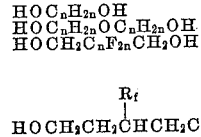

wherein $n$ is an integer from two to ten and wherein $R_f$ is a perfluoroalkyl group of from one to seven carbon atoms.

14. A process according to claim 13 when carried out in the presence of a liquid which is inert to materials 1 and 2, stable at the reaction temperatures employed, and which is easily removable at the completion of the polyesterification reaction.

15. A composition comprising (A) a linear polyester as defined in claim 1 and (B) a cross-linking agent therefor.

16. A composition according to claim 15 wherein said coss-linking agent is selected from the group consisting of free-radical polymerization catalysts, polyisocyanates and polyepoxides.

17. A composition according to claim 15 when containing additionally admixed a reinforcing filler.

18. A composition according to claim 17 wherein the additionally admixed filler contains carbon black.

19. A composition comprising (A) a linear polyester as defined in claim 1, (B) a chain extending agent therefor, and (C) a cross linking agent therefor.

20. A composition according to claim 19 wherein said chain-extending agent is selected from the group consisting of polyisocyanates, diamines, polyepoxides, diketenes, diacid chlorides, anhydrides, dianhydrides and mixtures of diisocyanates and amines.

21. A composition comprising (A) a linear polyester as defined in claim 11 and (B) a cross-linking agent therefor.

22. A composition comprising (A) a linear polyester as defined in claim 11, (B) a chain extending agent and (C) a cross-linking agent therefor.

23. A composition comprised of (A) a linear polyester as defined in claim 3 and (B) a cross-linking agent therefor.

24. A composition according to claim 23 when containing additionally admixed a reinforcing filler.

25. An elastomer produced by reacting at an elevated temperature the composition defined in claim 15.

26. An elastomer produced by reacting at an elevated temperature the composition defined in claim 17.

27. An elastomer produced by reacting at an elevated temperature the composition defined in claim 19.

28. An elastomer produced by reacting at an elevated temperature the composition defined in claim 21.

29. An elastomer produced by reacting at an elevated temperature the composition defined in claim 22.

30. An elastomer produced by reacting at an elevated temperature the composition defined in claim 23.

31. A process for the production of a fluorine-containing elastomer which comprises: reacting together at an elevated temperature a mixture comprising (1) a dicarboxylic compound having a formula selected from the group consisting of:

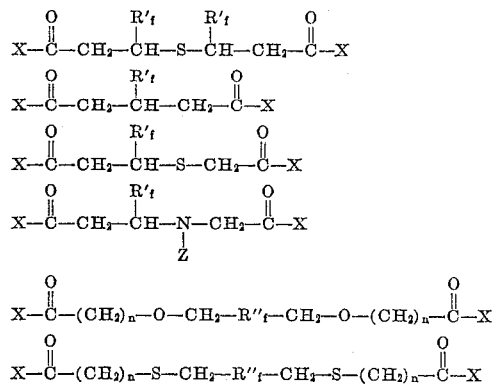

wherein $R'_f$ is a lower perfluoroalkyl group containing from one to seven carbon atoms, $R''_f$ is a lower perfluoroalkylene group containing from one to seven carbon atoms, X is selected from the group consisting of hydroxy, chloro-, lower alkoxy and anhydro-, Z is selected from the group consisting of alkyl and 1,1-dihydro perfluoroalkyl, and $n$ is an integer from one to three; and (2) a polyhydric alcohol having a formula selected from the group consisting of

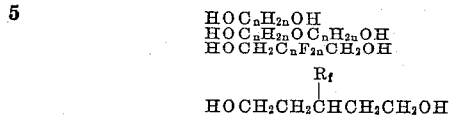

$$HOCH_2CH_2\overset{R_f}{\underset{|}{C}}HCH_2CH_2OH$$

wherein $n$ is an integer from two to ten and wherein $R_f$ is a perfluoro alkyl group of from one to seven carbon atoms to produce a linear polyester; (B) mixing the linear polyester thus formed together with a cross-linking agent therefor; and (C) reacting the mixture at vulcanizing temperature.

References Cited in the file of this patent

UNITED STATES PATENTS

| | | |
|---|---|---|
| 2,441,799 | D'Alelio | May 18, 1948 |
| 2,570,180 | Allewelt | Oct. 9, 1951 |
| 2,806,866 | Barnhart et al. | Sept. 17, 1957 |
| 2,831,025 | Drysdale | Apr. 15, 1958 |
| 2,871,260 | Drysdale | Jan. 27, 1959 |